United States Patent
Chandra

(10) Patent No.: US 9,690,919 B2
(45) Date of Patent: Jun. 27, 2017

(54) ALLOWING ACCESS TO APPLICATIONS BASED ON USER CAPACITANCE

(71) Applicant: GOOGLE INC., Mountain View, CA (US)

(72) Inventor: Deepak Chandra, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/540,011

(22) Filed: Nov. 12, 2014

(65) Prior Publication Data

US 2016/0034673 A1    Feb. 4, 2016

Related U.S. Application Data

(60) Provisional application No. 62/030,582, filed on Jul. 29, 2014.

(51) Int. Cl.
*G06F 21/32* (2013.01)
*G06F 21/31* (2013.01)
(Continued)

(52) U.S. Cl.
CPC .............. *G06F 21/32* (2013.01); *G06F 3/017* (2013.01); *G06F 21/31* (2013.01); *H04L 63/08* (2013.01);
(Continued)

(58) Field of Classification Search
CPC ... G06F 21/32; G06F 21/31; G06F 2221/2139
See application file for complete search history.

(56) References Cited

U.S. PATENT DOCUMENTS 6,111,517 A *  8/2000  Atick ............... G06F 21/32
                                                340/5.83
6,193,153 B1 * 2/2001  Lambert ........... G06F 3/03543
                                                235/380
(Continued)

OTHER PUBLICATIONS

Harrison, Chris, Munehiko Sato, and Ivan Poupyrev. "Capacitive fingerprinting: exploring user differentiation by sensing electrical properties of the human body." Proceedings of the 25th annual ACM symposium on User interface software and technology. ACM, 2012.*

(Continued)

*Primary Examiner* — James Turchen
(74) *Attorney, Agent, or Firm* — Johnson, Marcou & Isaacs, LLC

(57) ABSTRACT

Authenticating users comprises a computing device that receives a manual authentication input of a user and initiates a first user session between the user and the user computing device. The device communicates a request for a first user authorization data from an authentication technology associated with the one or more computing devices and receives the first user authentication data. The user or the device terminates the first user session and subsequently receives an input of the user to initiate a second user session. The device communicates a request for second user authentication data from the authentication technology and compares the first user authentication data and the second user authentication data. The device identifies a match of one or more features of the first user authentication data and one or more features of the second user authentication data and authorizes the user to conduct the second user session.

15 Claims, 7 Drawing Sheets

(51) Int. Cl.
*H04L 29/06* (2006.01)
*G06F 3/01* (2006.01)
*H04W 12/06* (2009.01)
*G06F 1/32* (2006.01)

(52) U.S. Cl.
CPC .......... *H04L 63/0861* (2013.01); *H04L 63/18* (2013.01); *H04W 12/06* (2013.01); *G06F 1/3215* (2013.01); *G06F 2221/2139* (2013.01)

(56) References Cited

U.S. PATENT DOCUMENTS

| | | | |
|---|---|---|---|
| 6,535,622 B1* | 3/2003 | Russo | G06K 9/00013 340/5.83 |
| 6,655,585 B2 | 12/2003 | Shinn et al. | |
| 6,724,919 B1* | 4/2004 | Akiyama | G06F 21/32 340/5.52 |
| 6,810,480 B1* | 10/2004 | Parker | G06F 21/32 713/168 |
| 6,993,166 B2 | 1/2006 | Lo | G06K 9/00067 382/124 |
| 7,305,562 B1 | 12/2007 | Bianco et al. | |
| 8,555,077 B2 | 10/2013 | Davis et al. | |
| 8,627,096 B2* | 1/2014 | Azar | G06F 21/32 713/186 |
| 8,886,252 B2 | 11/2014 | Luke et al. | |
| 8,918,079 B2* | 12/2014 | Bentley | H04L 63/08 455/411 |
| 9,288,669 B2* | 3/2016 | Burch | H04W 12/06 |
| 2002/0021278 A1* | 2/2002 | Hinckley | G06F 1/1626 345/156 |
| 2002/0116649 A1* | 8/2002 | Goshima | H04L 63/0815 726/21 |
| 2004/0042643 A1* | 3/2004 | Yeh | G06K 9/00221 382/118 |
| 2004/0062423 A1* | 4/2004 | Doi | G06F 21/32 382/118 |
| 2004/0152439 A1 | 8/2004 | Kimura et al. | |
| 2004/0232224 A1* | 11/2004 | Beenau | G06Q 20/00 235/380 |
| 2005/0041840 A1* | 2/2005 | Lo | G06K 9/00288 382/118 |
| 2005/0080906 A1 | 4/2005 | Pedersen | |
| 2005/0223222 A1* | 10/2005 | Graves | H04L 63/0428 713/165 |
| 2005/0252963 A1* | 11/2005 | Adams | G06F 12/1458 235/382 |
| 2006/0288234 A1 | 12/2006 | Azar et al. | |
| 2008/0130961 A1* | 6/2008 | Kinoshita | G06K 9/00281 382/118 |
| 2008/0175448 A1* | 7/2008 | Fujiwara | G06K 9/00208 382/118 |
| 2008/0209513 A1* | 8/2008 | Graves | G06F 19/327 726/2 |
| 2009/0160609 A1* | 6/2009 | Lin | G06F 21/32 340/5.83 |
| 2009/0171623 A1 | 7/2009 | Kiefer | |
| 2010/0138780 A1 | 6/2010 | Marano et al. | |
| 2010/0162182 A1 | 6/2010 | Oh et al. | |
| 2010/0257490 A1 | 10/2010 | Lyon et al. | |
| 2011/0117970 A1 | 5/2011 | Choi et al. | |
| 2011/0135166 A1* | 6/2011 | Wechsler | G06K 9/00288 382/118 |
| 2011/0162067 A1 | 6/2011 | Shuart et al. | |
| 2011/0246904 A1 | 10/2011 | Pinto et al. | |
| 2011/0260829 A1 | 10/2011 | Lee et al. | |
| 2011/0296505 A1 | 12/2011 | Perez et al. | |
| 2012/0002846 A1* | 1/2012 | Yokoi | G06K 9/6265 382/115 |
| 2012/0007713 A1 | 1/2012 | Nasiri et al. | |
| 2012/0303476 A1* | 11/2012 | Krzyzanowski | G06F 8/60 705/26.5 |
| 2013/0167212 A1 | 6/2013 | Azar et al. | |
| 2013/0223696 A1 | 8/2013 | Azar et al. | |
| 2013/0267204 A1 | 10/2013 | Schultz et al. | |
| 2013/0347070 A1* | 12/2013 | Cairns | H04L 63/126 726/3 |
| 2014/0096024 A1* | 4/2014 | Laurent | G06F 21/128 715/739 |
| 2014/0282868 A1* | 9/2014 | Sheller | G06F 21/31 726/3 |
| 2014/0333414 A1* | 11/2014 | Kursun | G06K 9/00926 340/5.82 |
| 2015/0071508 A1* | 3/2015 | Boshra | G06K 9/00013 382/124 |
| 2015/0169854 A1 | 6/2015 | Chang et al. | |
| 2015/0178542 A1* | 6/2015 | Minteer | G06K 9/0002 382/124 |
| 2015/0199501 A1 | 7/2015 | Husain | |
| 2015/0220850 A1 | 8/2015 | Husain | |
| 2015/0220931 A1* | 8/2015 | Alsina | G06Q 20/12 705/44 |
| 2015/0278495 A1* | 10/2015 | Yu | G06F 21/32 713/186 |
| 2015/0363585 A1* | 12/2015 | Gooding | G06F 21/32 726/19 |
| 2016/0006730 A1 | 1/2016 | Chari et al. | |
| 2016/0034674 A1 | 2/2016 | Chandra | |
| 2016/0034675 A1 | 2/2016 | Chandra | |
| 2016/0034678 A1 | 2/2016 | Chandra | |

OTHER PUBLICATIONS

Vu, Tam, et al. "Distinguishing users with capacitive touch communication." Proceedings of the 18th annual international conference on Mobile computing and networking. ACM, 2012.*
Korsak, "Office Action issued in copending U.S. Appl. No. 14/540,020=3, filed Nov. 12, 2014", Mar. 17, 2016, 1-15.
Turchen, "Office Action issued in copending U.S. Appl. No. 14/540,016, filed Nov. 12, 2014", Apr. 12, 2016, 1-15.
Turchen, "Office Action issued in copending U.S. Appl. No. 14/540,016, filed Nov. 12, 2014", Nov. 19, 2015, 1-12.
Turchen, "Office Action issued in copending U.S. Appl. No. 14/540,020, filed Nov. 12, 2014", Dec. 4, 2015, 1-13.
Turchen, "Office Action issued in copending U.S. Appl. No. 14/540,020, filed Nov. 12, 2014", Apr. 20, 2016, 1-14.
Chandra, "U.S. Office Action issued in copending U.S. Appl. No. 14/540,023, filed Nov. 12, 2014", mailed on Nov. 14, 2016, 8 pages.
Korsak, "U.S. Office Action issued in copending U.S. Appl. No. 14/540,023, filed Nov. 12, 2014", mailed on Aug. 2, 2016, 21 pages.
Turchen, "U.S. Office Action issued in copending U.S. Appl. No. 14/540,016, filed Nov. 12, 2014", mailed on Jul. 28, 2016, 16 pages.
Turchen, "U.S. Office Action issued in copending U.S. Appl. No. 14/540,020, filed Nov. 12, 2014", mailed on Aug. 11, 2016, 14 pages.

* cited by examiner

300

305
Authentication application receives user authorization of user handling

220
Authentication application receives authorization input from user

325
Authentication application receives initial input of handling of user device

230
Authentication application stores input

235
Authentication application session times out

240
Authentication application receives activation of user device

345
Authentication application receives input of handling technology of user device

350
Authentication application compares input of handling of user device with stored input to determine if user is authenticated

Fig. 3

ALLOWING ACCESS TO APPLICATIONS BASED ON USER CAPACITANCE

RELATED APPLICATION

This patent application claims priority under 35 U.S.C. §119 to U.S. Patent Application No. 62/030,582, filed Jul. 29, 2014 and entitled "User Authentication." The entire contents of the above-identified application are hereby fully incorporated herein by reference.

TECHNICAL FIELD

The technology disclosed herein relates to using various user computing device technologies for simplifying authentication for users. Accessing data about the user via user computing device technologies, such as capacitance, user handling of the device, and a camera module, allows the user computing device to more efficiently, accurately, and securely provide the user access to applications or other functions of the user device.

BRIEF DESCRIPTION OF THE DRAWINGS

FIG. 3 is a block flow diagram depicting methods for authenticating users based on user handling of the user computing device, in accordance with certain example embodiments.

SUMMARY

Figure 1:
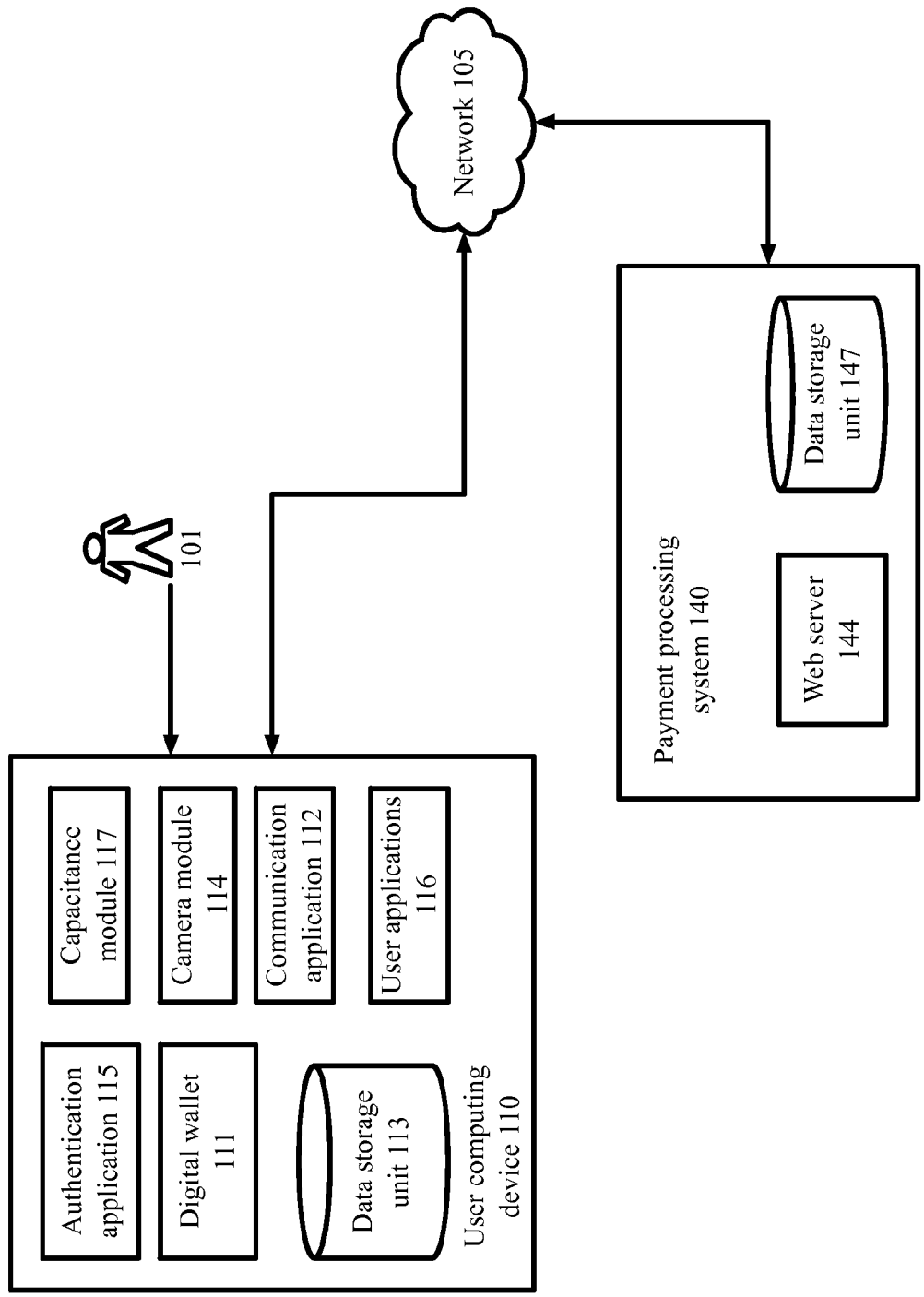
FIG. 1 is a block diagram depicting a system for authenticating users, in accordance with certain example embodiments of the technology disclosed herein.

Techniques herein provide computer-implemented methods to authenticate users. In an example embodiment, user authentication comprises a user computing device that receives a manual authentication input of a user via a user interface of a user computing device and initiates a first user session between the user and the user computing device. The system communicates a request for a first user authorization data from an authentication technology associated with the one or more computing devices and receives the first user authentication data. The user or the system terminates the first user session and subsequently receives an input of the user to initiate a second user session. The system communicates a request for second user authentication data from the authentication technology and compares the first user authentication data and the second user authentication data. The system identifies a match of one or more features of the first user authentication data and one or more features of the second user authentication data and authorizes the user to conduct the second user session.

In certain example embodiments, the authentication technology may be a capacitance module of the user computing device. In certain example embodiments, the authentication technology may be a camera module of the user computing device. In certain example embodiments, the authentication technology may be a gyroscope and/or an accelerometer of the user computing device.

In certain example embodiments, the user computing device may use the one or more authentication technologies to determine a user's access to the user computing device and/or one or more applications on the user computing device. The authentication application may determine the authentication technology results for the attempted user session and allow access to certain applications or other functions of the user computing device based on the results.

In certain other example aspects described herein, systems and computer program products to authenticate users are provided.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Embodiments herein provide computer-implemented techniques for using authentication technologies of a user computing device to authenticate users. A typical user computing device comprises technologies, modules, applications, and other hardware and software that may be utilized to authenticate a user for a session with the user computing device.

In an example embodiment, the user computing device utilizes an authentication application to receive inputs from the authentication technologies to control access to the user computing device. The authentication application may require an action or input from the user to utilize one or more of the authentication technologies. The authentication application may display the available authentication technologies to the user. For example, the available authentication technologies may include a camera module, a capacitance module, and a voice recognition module. The user may review the list of available authentication technologies and input an option to allow a certain authentication technology to be used to authenticate the user, but prohibit a different authentication technology. In the example, the user may allow a capacitance module and a voice recognition technology, but prohibit the camera module.

A user provides an authentication to the user computing device, such as a password, a personal identification number ("PIN"), or other configured authentication information. After the user is authenticated, the authentication application receives an initial input from one or more of the authentication technologies. The initial input is saved in a storage device. The storage device may be a local storage device on the user computing device that is secured so as to prevent unauthorized access.

In the example, the session with the user computing device ends. The user may manually end the session by setting the computing device to an inactive state. The user may stop using the user computing device for a period of time that causes the user computing device to end the session or "time out." The session may be ended for any suitable reason.

The user reactivates the user computing device at a time after termination of the previous authentication session. The user may actuate a physical or virtual button or other object to initiate the user computing device.

The authentication technologies provide an input of user authentication data to the authentication application. The authentication application compares the input to the stored initial input that is stored in the database associated with the user. If one or more features of the inputs match, then the user is authenticated and permission is granted by the authentication application to allow the user access to one or more applications or functions of the user computing device, without reentry of the one or more manual authentication inputs such as a password, a PIN, or other configured authentication information.

In an example, an accelerometer and a gyroscope may be utilized as an authentication technology. The accelerometer and the gyroscope, or other related modules, may be used to determine how the user handles the user computing device. The authentication application may determine, based on the accelerometer and the gyroscope, the motions of the user as the user holds the user computing device. For example, the authentication application may determine the angle at which the user frequently holds the user computing device. The angle may be indicative of aspects of the manner in which the user handles the device. In another example, the authentication application may determine hand motions that are frequently made by the user while holding the user computing device.

The authentication application may store the angles and motions of the user in a database associated with the user. The angles and motions additionally may be correlated by the authentication application to other factors related to the user. For example, the angles and the motions may indicate that the user is right handed or left handed. The angles and the motions may indicate that the user typically employs the user computing device while moving in a vehicle. The angles and the motions may indicate that the user typically employs the user computing device while seated. Any typical input that provides an indication of a manner that the user frequently handles the user computing device may be stored by the authentication application.

In the example, the user activates the user computing device at a time after termination of the previous session. The accelerometer and the gyroscope provide an input of the user's handling of the user computing device to the authentication application. The authentication application compares the input to the initial input that is stored in the database associated with the user. If the inputs match, or match to a configured level for authentication, then the user is authenticated and permission is granted by the authentication application to allow the user access to one or more applications or functions of the user computing device. In certain example embodiments, other authentication technologies may be combined with the input of the accelerometer and the gyroscope to determine an overall user authentication level.

In another example, a camera module may be utilized as an authentication technology. The camera module, or other related image capturing modules or external camera devices, may be used to determine if the user is authenticated. The authentication application may determine, based on the camera module, whether the current user is the authenticated user. For example, the camera module captures an image of the user at the time that the user is authenticated, such as when the user inputs a PIN or password to access the user computing device.

The image captured by the camera module may provide to the authentication application data about the user at the time of the PIN authentication. For example, the authentication application may identify the color of a shirt being worn by the user. In another example, the authentication application may identify the facial hair of the user. In another example, the authentication application may identify the background of the user, such as a window or a lamp. In another example, the authentication application may perform a facial recognition algorithm on the image of the user. Any other identifiable data from the image may be used. The authentication application may store the identified images in a database associated with the user.

In the example, the user activates the user computing device at a time after termination of the previous session. The camera module provides an image captured substantially at the time that the user activates the user computing device. The authentication application compares the captured image to the initial image that is stored in the database associated with the user. If the images include matching features, then the user is authenticated and permission is granted by the authentication application to allow the user access to one or more applications or functions of the user computing device.

For example, the authentication application determines if the user attempting the activation is wearing a shirt of the same color or style as the user was wearing when the user initially input a PIN or password to access the user computing device. In another example, the authentication application identifies background objects from the image, such as a window or a lamp that match data that was input at the time when the user initially input a PIN or password to access the user computing device. In another example, the authentication application determines if the user attempting the activation has similar facial hair as the user when the user when initially inputting a PIN or password to access the user computing device. Any suitable information from the camera image that can be matched to data stored in the database may be used to provide an indication that the activating user is the authenticated user. In certain example embodiments, other authentication technologies may be combined with the input of the camera module to determine an overall user authentication level.

In another example, a capacitance module may be utilized as an authentication technology. The capacitance module, or other related technology that captures electrical properties of a user, may be used to determine if the user is authenticated. The authentication application may determine, based on the capacitance module, whether the current user is the authenticated user. For example, the capacitance module captures a capacitance of the user at the time that the user is authenticated, such as when the user inputs a PIN or password to access the user computing device. The capacitance may be captured by two capacitance sensors on the user computing device. The capacitance depends on the path that electricity takes through the body—if the signal goes in the left hand and out the right hand, then the capacitance will be different than if the electricity goes in and out of adjacent fingers. The capacitance measurement thus is dependent on the manner in which the user touches the sensors and also by the particular capacitance of the body of the user.

The capacitance captured by the capacitance module may provide to the authentication application data about the user at the time of the PIN authentication. For example, the authentication application may identify the capacitance of the user. The authentication application may store the identified capacitance in a database associated with the user.

In the example, the user activates the user computing device at a time after termination of the previous session. The capacitance module provides an input of the user capacitance captured substantially at the time that the user activates the user computing device. The authentication application compares the input to the initial input that is stored in the database associated with the user. If the inputs match, then the user is authenticated and permission is granted by the authentication application to allow the user access to one or more applications or functions of the user computing device. In certain example embodiments, other authentication technologies may be combined with the input of the capacitance module to determine an overall user authentication level.

The authentication application on the user computing device may use the one or more authentication technologies to determine a user's access to the user computing device and/or one or more applications or functions on the user computing device. The authentication application may determine the authentication state of the results of the authentication technology for the attempted user session and calculate a user authorization rating.

In an example, the authentication application may determine that the capacitance module produced a match with the stored input, the camera module produced a match for the shirt color and the facial hair, the handling technology produced a match for the angle of the user computing device, but a voice recognition analysis did not produce a match for the user. In this example, a 100% match of the authentication technologies was not produced. In the example, the authentication application allows the user access to a group of applications, but withholds access from the digital wallet application module. The allowed applications may be directed toward functions that are not deemed by the authentication application to be security risks. For example, the user may be allowed access to the camera module, a contact list application, and one or more games. In the example, the user may be prompted to enter a manual authentication, such as a PIN, to access all features of the user computing device. The particular level of authentication for each application or for particular functions of an application can be configured to provided a desired level of security for particular applications or application functions.

The authentication application may compare the user authorization rating to a database of authentication ratings to determine the appropriate level of access. In certain examples, if 5 out of 6 authentication technologies indicate that the user is the authorized user, then the system may provide a recommendation to the authentication application to allow full access to the user. If only 2 out of 5 authentication technologies indicate that the user is the authorized user, then the system may provide a recommendation to the authentication application to allow the user to access the user computing device, but withhold any secure data or applications that are configured as secure applications.

In certain examples, based on the comparison with the database, the authentication application may allow any percentage of applications or programs on the user computing device to be accessed, such as 10% of the applications, 50% of the applications or all of the applications. In certain examples, certain authentication technologies are given more weight than other authentication technologies. For example, if a facial recognition algorithm from the camera module provides a matching input, but the angle in which the user is handling the device does not produce a match, the authentication application may still allow access to the user because the facial recognition is weighted to be a more reliable measurement.

By using and relying on the methods and systems described herein, the user computing device technologies can provide accurate and reliable user data for authenticating the user. As such, the systems and methods described herein may be employed to allow the user computing device to access user data provided by the authentication technologies, and use the user data to authenticate the user without the need for additional user input of security information. The user is not troubled to provide a personal identification code, password, or certain other manually entered authentication data to access certain functions of the user computing device for a subsequent authenticated session. The system can access the user capacitance, user handling of the device, a camera module, or certain other authentication technologies to enable the user computing device to more efficiently, accurately, and securely authenticate the user for access to applications or other functions on the user device. Hence, the methods and systems described herein decrease user frustration and permit accurate and reliable user authentication.

Example System Architectures

Turning now to the drawings, in which like numerals represent like (but not necessarily identical) elements throughout the figures, example embodiments are described in detail.

FIG. 1 is a block diagram depicting a system for authenticating users, in accordance with certain example embodiments. As depicted in FIG. 1, the system 100 includes network computing systems 110 and 140 that are configured to communicate with one another via one or more networks 105. In some embodiments, a user associated with a device must install an application and/or make a feature selection to obtain the benefits of the techniques described herein.

Each network 105 includes a wired or wireless telecommunication means by which network devices (including devices 110 and 140) can exchange data. For example, the network 105 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network computing system 110 and 140 includes a device having a communication module capable of transmitting and receiving data over the network 105. For example, each network device 110 and 140 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 110 and 140 are operated by end-users or consumers and payment processing system operators, respectively.

The user 101 can use a communication application module 112, which may be, for example, a web browser application or a stand-alone application, to view, download, upload, or otherwise access documents or web pages via the distributed network 105. The user computing device 110 may employ the communication module 112 to communicate with the payment processing system 140 or other servers. The communication module 112 may allow devices to communicate via technologies other than the network 105. Examples might include a cellular network, radio network, or other communication network.

The user computing device 110 may include a digital wallet application module 111. The digital wallet application module 111 may encompass any application, hardware, software, or process the user computing device 110 may employ to assist the user 101 in completing a purchase. The digital wallet application module 111 can interact with the communication application 112 or can be embodied as a companion application of the communication application 112. As a companion application, the digital wallet application module 111 executes within the communication application 112. That is, the digital wallet application module 111 may be an application program embedded in the communication application 112.

The user computing device 110 may include an authentication application 115. The authentication application 115 may employ a software interface for configuration and operation by the user 101. The authentication application 115 may be associated with a secure element on the user computing device 110, or otherwise operate directly on the operating system of the user computing device 110. In certain embodiments, the functions of the authentication application 115 are performed by the operating system of the user computing device 110 or by another suitable application.

The authentication application 115 may be used to receive inputs of authentication data and determine if the user 101 is authenticated for performing a particular action with the user computing device 110. Any of the functions described in the specification as being performed by the authentication application 115 can be performed by the payment processing system 140, the user computing device 110, the digital wallet application module 111, or any other suitable hardware or software system or application.

The user computing device 110 includes a data storage unit 113 accessible by the authentication application 115, the web browser application 112, or any suitable computing device or application. The exemplary data storage unit 113 can include one or more tangible computer-readable media. The data storage unit 113 can be stored on the user computing device 110 or can be logically coupled to the user computing device 110. For example, the data storage unit 113 can include on-board flash memory and/or one or more removable memory cards or removable flash memory.

The user computing device 110 includes a camera module 114. The camera module 114 may be any module or function of the user computing device 110 that obtains a digital image. The camera module 114 may be onboard the user computing device 110 or in any manner logically connected to the user computing device 110. The camera 114 may be capable of obtaining individual images or a video scan. Any other suitable image capturing device may be represented by the camera 114.

The user computing device 110 may include user applications 116. The user applications 116 may be contact applications, email applications, or any applications that may require authentication of the user 101.

The user computing device 110 includes a capacitance module 117. The capacitance module 117 may be any module or function of the user computing device 110 that obtains a capacitance of the user 101. The capacitance module 117 may be onboard the user computing device 110 or in any manner logically connected to the user computing device 110. Any other suitable capacitance capturing device may be represented by the capacitance module 112.

The payment processing system 140 includes a data storage unit 147 accessible by the web server 144. The example data storage unit 147 can include one or more tangible computer-readable storage devices. The payment processing system 140 is operable to conduct payments between a user 101 and a merchant system (not pictured). The payment processing system 140 is further operable to manage a payment account of a user 101, maintain a database to store transactions of the merchant system and the user 101, verify transactions, and other suitable functions. Functions of the authentication application 115 may be performed by the payment processing system 140. The payment processing system 140 may manage or participate in the authentication process to prevent fraudulent usage of the financial accounts associated with the user computing device 110.

The user 101 may use a web server 144 on the payment processing system 140 to view, register, download, upload, or otherwise access the payment processing system 140 via a website (not illustrated) and a communication network 105. The user 101 associates one or more registered financial card accounts, including bank account debit cards, credit cards, gift cards, loyalty cards, coupons, offers, prepaid offers, store rewards cards, or other type of financial account that can be used to make a purchase or redeem value-added services with a payment account of the user 101.

The payment processing system 140 represents any system that participates in the authentication of the user 101 for the purposes of security or for other reasons. The payment processing system 140 desires for the user 101 to be the authentic user 102 to minimize a number of fraudulent financial transactions. Other systems may desire for the user 101 to be the authentic user 101 to prevent unauthorized emails, texts, Internet uploads, data extractions, or any other fraudulent actions.

It will be appreciated that the network connections shown are exemplary and other means of establishing a communications link between the computers and devices can be used. Additionally, those having ordinary skill in the art having the benefit of the present disclosure will appreciate that the user computing device 110 and payment processing system 140 illustrated in FIG. 1 can have any of several other suitable computer system configurations. For example, a user computing device 110 embodied as a mobile phone or handheld computer may not include all the components described above.

Figure 7:
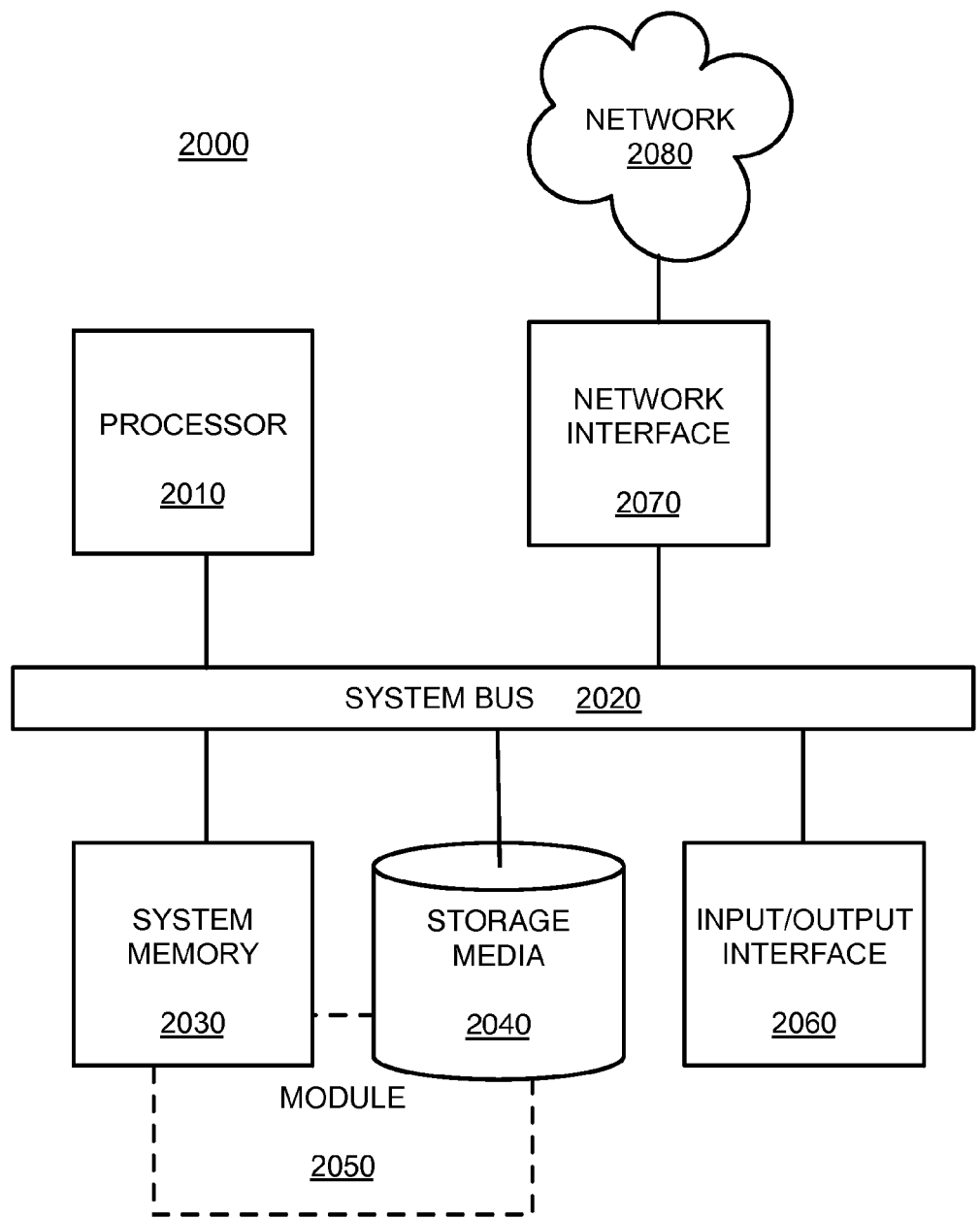
FIG. 7 is a block diagram depicting a computing machine and a module, in accordance with certain example embodiments.

In example embodiments, the network computing devices and any other computing machines associated with the technology presented herein may be any type of computing machine such as, but not limited to, those discussed in more detail with respect to FIG. 7. Furthermore, any modules associated with any of these computing machines, such as modules described herein or any other modules (scripts, web content, software, firmware, or hardware) associated with the technology presented herein may by any of the modules discussed in more detail with respect to FIG. 7. The computing machines discussed herein may communicate with one another as well as other computer machines or communication systems over one or more networks, such as network 105. The network 105 may include any type of data or communications network, including any of the network technology discussed with respect to FIG. 7.

Example Processes

The example methods illustrated in FIGS. 2-6 are described hereinafter with respect to the components of the example operating environment 100. The example methods of FIGS. 2-6 may also be performed with other systems and in other environments.

Figure 2:
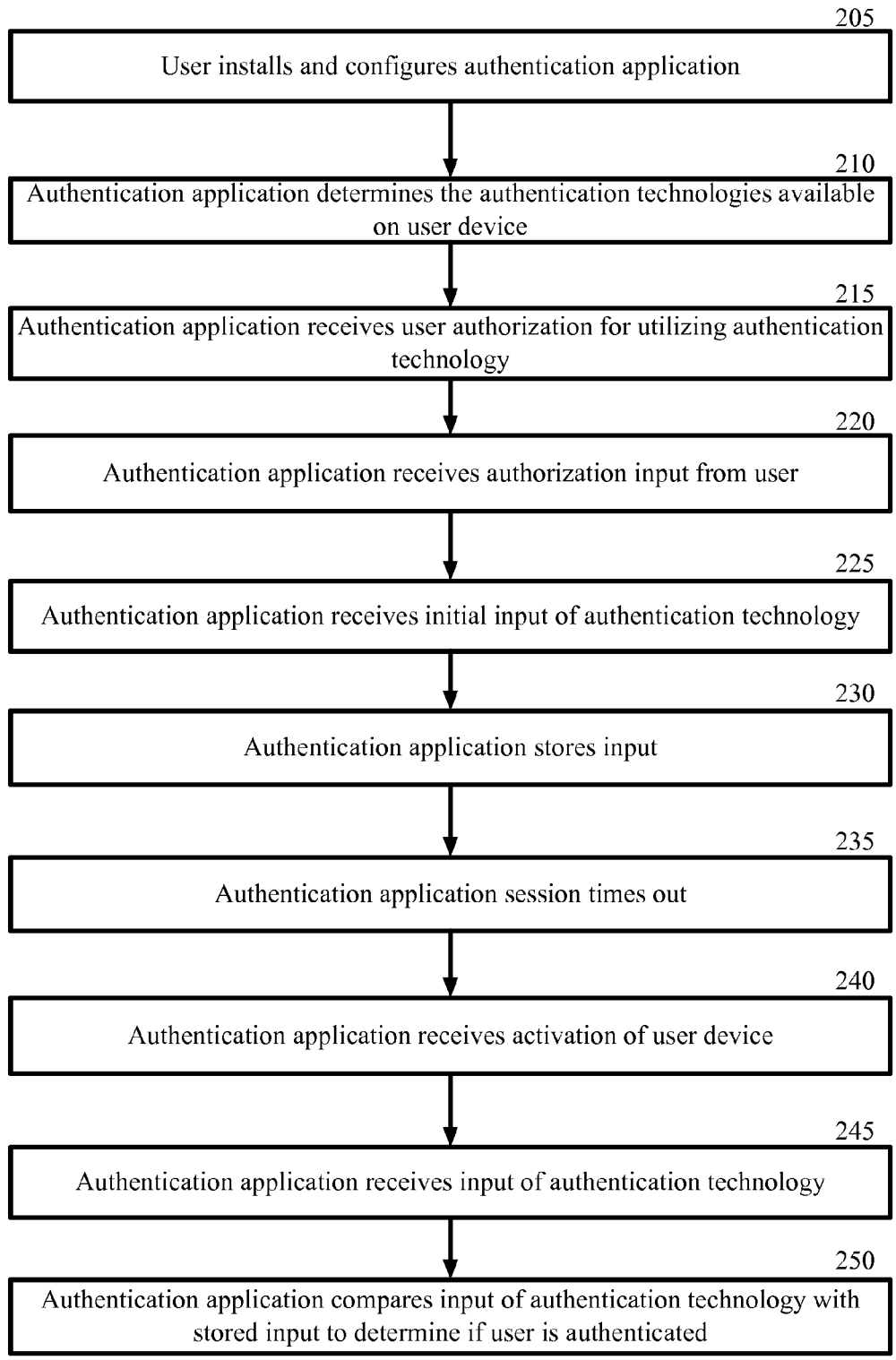
FIG. 2 is a block flow diagram depicting methods for using authentication technologies to authenticate users, in accordance with certain example embodiments.

FIG. 2 is a block flow diagram depicting a method 200 for using authentication technologies to authenticate users 101, in accordance with certain exemplary embodiments.

With reference to FIGS. 1 and 2, in block 205 a user 101 installs and configures an authentication application 115. The authentication application 115 may be installed on the user computing device 110 at the time of manufacturing, when sold to the user 101, as part security offering, at the time of an operating system upgrade, or at any suitable time. In an example, the authentication application 115 may be downloaded from a system associated with the user computing device 110, such as the payment processing system 140, the manufacturing system of the user computing device 110, or any suitable system. In another example, the authentication application 115 may be downloaded from a system associated with another application on the user computing device, such as a digital wallet application module 111. Any of the functions described in the specification as being performed by the authentication application 115 can be performed by the payment processing system 140, the user computing device 110, the digital wallet application module 111, or any other suitable hardware or software system or application.

In block 210, the authentication application 115 determines the authentication technologies available on the user computing device 110. In an example, the authentication application 115 accesses the operating system on the user computing device 110 and identifies authentication technologies on the user computing device 110, such as the camera module 114, the capacitance module 117, the accelerometer (not pictured), the gyroscope (not pictured), or other authentication technologies. A list of authentication technologies and other capabilities of the user computing device 110 may be provided by the operating system on the user computing device 110 to the authentication application 115.

In block 215, the authentication application 115 receives user authorization for utilizing authentication technology. The authentication application 115 may access the list of authentication technologies available on the user computing device 110 and provide the list to the user 101 via user interface of the user computing device 110. The user 101 may select one or more of the authentication technologies to enable for authentication purposes by actuating a control on the user interface associated with each authentication technology. For example, the user 101 may select a virtual control object labeled "enable" associated with the capacitance module. The authentication application 115 may provide an option for the reader to click a link or other function that provides an explanation to the user 101 of the manner in which the authentication technology operates and the measurements or actions that are logged by the authentication technology. In another example, the user computing device 110 provides a single authentication technology to the user 101 at a time. Each authentication technology is enabled or disabled by the user 101 before the next authentication technology is presented.

In block 220, the authentication application 115 receives an authorization input from the user 101. The user 101 provides an authentication to the user computing device 110, such as a password, a personal identification number ("PIN") or other configured authentication information. The authorization input may be provided by the user 101 when the user 101 activates the user computing device 110. The activation may be the first activation on the current day, the first activation after a certain amount of time of inactivity, or a first activation based on any other schedule or configuration. In certain embodiments, the first activation may not utilize any of the authentication technologies, but requires an input of data from the user 101, such as a PIN. In alternate embodiments, the first activation may utilize one or more of the authentication technologies in conjunction with an input of data from the user 101. Any combination of user input, authentication technologies, or other authorization techniques may be employed in the first authorization.

Upon receiving the input of the user 101, the authentication application 115 allows the user 101 to access the authorized functions of the user computing device 110. The authentication application 115 compares the input of the user 101 to a configured authorization database associated with the user 101. For example, the authentication application 115 accesses a stored PIN of the user 101 and compares the input of the user 101 with the stored PIN. If the PINs match, then the user 101 is determined to be authorized.

In block 225, the authentication application 115 receives an initial input of an authentication technology. In the example, after the user 101 authorized the use of an authentication technology, the authentication application 115 provides a request to the operating system of the user computing device 110 to initiate the authentication technology. For example, the authentication application 115 provides a request to the operating system of the user computing device 110 to initiate a capacitance module 117.

The request may include instructions to take an initial measurement of the user 101 or otherwise log the appropriate data. For example, the capacitance module 117 may be prompted by the user computing device 110 to obtain a capacitance measurement of the user 101. In the example, the capacitance module 117 is initiated and begins a process to guide a user 101 through the measurement process. The method for a capacitance module 117 to obtain a measurement from a user 101 is described in greater detail in the method 500 of FIG. 5.

After obtaining a measurement or other data, the authentication technology communicates the input to the authentication application 115. The data may be communicated via the operating system of the user computing device 110.

In block 230, the authentication application 115 receives the input and stores the input in a database associated with the user 101. The input may be stored in the data storage unit 113, in a cloud computing environment, or in any suitable location. The input may be associated with the particular authentication technology that provides the input. The input may be configured by the authentication application 115 to be the preferred input from an authentication technology to authorize a user 101.

In block 235, the authentication application 115 session times out. In an example, the user 101 closes the active session of a user computing device 110. The user 101 may close the session by logging out of the session, turning off the user computing device 110, putting the user computing device 110 in an inactive mode, or performing any other suitable action. In another example, the user computing device 110 or the authentication application 115 close the active session automatically. For example, the user computing device 110 enters an inactive mode after a configured period of time has elapsed with no user 101 interaction. In another example, the authentication application 115 is configured to close an active session and require a user authorization after a configured period of time has elapsed. After an active session has ended, the user 101 is prevented from accessing one or more of the functions of the user computing device 110. In this state, the authentication application 115 requires a new authorization from the user 101.

In block 240, the authentication application 115 receives in activation of the user computing device 110. For example, the user 101 initiates an inactive user computing device 110 and request access to one or more applications. The user 101 may initiate a user session by actuating a real or virtual button to activate the user computing device 110. As the previous active session has timed out, the user 101 is unable to access one or more functions of the user computing device 110.

In block 245, the authentication application 115 receives an input of one or more of the authentication technologies. The authentication technologies are requested to provide an input of the authorization state of the user 101 to the authentication application 115. The requests may be communicated via the operating system of the user computing device 110.

The authentication technologies may receive the request and initiate a process to obtain a user authentication. In an example, a capacitance module 110 provides instructions to the user 101 to perform the actions required to obtain a current capacitance of the user 101. An example of the actions required is described in greater detail in the method 500 of FIG. 5. Each of the one or more authentication technologies may provide an input of the user authorization. In certain examples, one or more of the authentication technologies may be unable to provide an input.

In block 250, the authentication application 115 compares the input of the authentication technology with the stored input from the initial input of the authentication technology to determine if the user 101 is authenticated. The authentication application 115 accesses the database associated with the user 101 and extracts the initial input from the authentication technology. The current input is compared to the initial input to determine if a match exists. In certain examples, the match is not required to be an exact match. A margin of error between the inputs may allowed based the configuration of the authentication application 115. In an example, the capacitance of the user 101 may vary throughout the day or from one day to the next. If the capacitance of user 101 is not exactly the same as the initial input of the capacitance of the user 101, the inputs will still be considered a match if the inputs are within a configured range of each other.

In an example, a configured number of authentication technology inputs must provide matching results for the user 101 to be authenticated. For example, three out of five authentication technologies may be required to authenticate the user 101. In another example, one or more of the authentication technologies alone may configured to provide an authentication of the user 101. For example, a fingerprint scanning authentication technology may provide and authentication of the user 101 even if no other authentication technology inputs provide a match.

If the user 101 is authenticated, then the authentication application 115 and/or the user computing device 110 allows the user 101 access to the desired functions of the user computing device 110. For example, if the user 101 desires access to the digital wallet application module 111 and provides the appropriate authentication, then access to the digital wallet application module 111 is provided to the user 101. The user 101 may then utilize the digital wallet application module 111 to conduct transactions or perform other functions.

FIG. 3 is a block flow diagram depicting methods 200 for authenticating users 101 based on user handling of the user computing device 101, in accordance with certain example embodiments.

With reference to FIGS. 1 and 2, in block 305 the authentication application 115 receives user authorization of user handling authentication technology. The user 101 may select the user handling authentication technology for enablement for authentication purposes by actuating a control on the user interface associated with user handling authentication technology. For example, the user 101 may select a virtual control object labeled "enable" associated with the user handling authentication technology. The authentication application 115 may provide an option for the reader to click a link or other function that provides an explanation to the user 101 of the manner in which the user handling authentication technology operates and the measurements or actions that are logged by the user handling authentication technology.

In block 220, the authentication application 115 receives the authorization input from the user 101. Block 220 is described in greater detail with respect to block 220 of FIG. 2.

In block 325, the authentication application 115 receives an initial input of handling of the user computing device 110 by the user 101.

In the example, after the user 101 authorized the use of an authentication technology, the authentication application 115 provides a request to the operating system of the user computing device 110 to initiate the authentication technology. For example, the authentication application 115 provides a request to the operating system of the user computing device 110 to initiate a log of user 101 interaction with the user computing device 110 via an accelerometer and/or a gyroscope. These and other suitable hardware or software suitable to logging user handling of the user computing device 110 will be collectively referred to as "handling technology." The management of the handling technology, and thus the communication with the authentication application 115, may be performed by a specific application, by the authentication application 115, by the user computing device operating system, or by any suitable hardware or software.

The request may include instructions to the handling technology to take an initial measurement of the user 101 or otherwise log the appropriate data. For example, the handling technology may be prompted by the user computing device 110 to log characteristics of the user handling.

In an example, the handling technology is initiated and begins a process of characterizing the manner that the user 101 handles the user computing device 110. In an example, the handling technology may determine, based on the manner in which the user 101 typically holds the user computing device 110, whether the user 101 typically holds the user computing device 110 in the right or left hand. The handling technology may access a database that stores the tilt of the user computing device of right or left handed people. If the tilt of the user computing device 110 matches, or nearly matches, the tilt of left handed people, then the handling technology may determine the user 101 is likely left handed. In another example, the handling technology may determine that the angle of the contact of a finger of a user 101 with a touchscreen of the user computing device 110 may match the angle of contact of people that are left handed. Any other aspect of the handling of the user computing device 110 that matches the use by an identifiable group of people may be used to further identify the user 101 for authentication.

In another example, the handling technology may determine that the user 101 holds the user computing device 110 at a particular angle. The angle that the user 101 holds the device may be indicative of whether a user 101 often accesses the user computing device 110 while sitting. The angle that the user 101 holds the device may be indicative of a user 101 that often accesses the user computing device 110 while walking. The angle that the user 101 holds the user computing device 110 may be indicative of a user 101 that wears bi-focal glasses and changes the angle of the user computing device 110 to allow easier reading. The handling technology stores the angle that the user 101 holds the user computing device 110 while reading, while typing, while playing games, or performing any other suitable tasks. The angle may be determined by a gyroscope embedded in the user computing device 110 or by any other suitable hardware or software. The handling technology may log the angle that the user 101 employs for a given time period, such as one day. In an example, the handling technology may identify the angle that the user 101 employs for the longest time period during a given day, or the handling technology may identify multiple angles that the user 101 employs. Any suitable characterization or quantifying of the angle that the user 101 employs may be logged and stored.

In another example, the handling technology may determine that the user 101 often accesses the user computing device 110 while travelling in a vehicle, such as a bus or a plane. In another example, the handling technology may determine that the user 101 has not moved the user computing device 110 from a particular area since the last user authorization. The handling technology may identify the movement of the user 101 based on the accelerometer, a global positioning system ("GPS") technology, or any suitable hardware or software. The handling technology may log the movements of the user 101 and compare the movements to a database of stored movements to determine if the movements match a particular pattern of travel. For example, a bus may move in a particular pattern, such as following a standard route and making frequent stops. Any other suitable user handling data may be logged and compiled by the handling technology.

After logging one or more measurements or other data, the handling technology communicates an input of the logged data to the authentication application 115.

From block 325, the method 300 proceeds to block 230. Blocks 230 through 240 are substantially similar to blocks 230 through 240 as described in FIG. 2. From block 240, the method 300 proceeds to block 345.

In block 345, the authentication application 115 receives the input of the handling technology of the user computing device 110. After the user 101 attempts to activate the inactive user computing device 110 or one or more inactive applications, the handling technology is requested to provide an input of the handling of the user 101 to the authentication application 115. The request may be communicated via the operating system of the user computing device 110.

The handling technology may receive the request and initiate a process to obtain a user authentication. In an example, the handling technology logs the current actions of the user 101 to determine the manner of the handling of the user computing device 110 by the user 101. Any of the manners of handling the user computing device 110 as described in block 325, or other manners, may be logged by the handling technology. The data logged by the handling technology is communicated to the authentication application 115.

In block 350, the authentication application 115 compares the input of the handling of the user computing device 110 with the stored input to determine if the user 101 is authenticated. The authentication application 115 accesses the database associated with the user 101 and extracts the initial input from the handling technology. The current input is compared to the initial input to determine if a match exists. In certain examples, a match is not required to be an exact match. A margin of error between the inputs may be allowed based the configuration of the authentication application 115. In an example, the angle of holding of the user computing device 110 may vary throughout the day or from one day to the next. If the angle of the user 101 is not exactly the same as the initial input of the angle of the user 101, the inputs will still be considered a match if the inputs are within a configured range of each other.

In an example, a configured number of authentication technology inputs must provide matching results for the user 101 to be authenticated. For example, the handling technology may be one of three authentication technologies may be required to authenticate the user 101. In another example, the handling technology alone may configured to provide an authentication of the user 101. In another example, the handling technology may not produce a match, but the user 101 may still be authenticated if a one or more other authentication technologies provide matching inputs.

If the user 101 is authenticated, then the authentication application 115 and/or the user computing device 110 allows the user 101 access to the desired functions of the user computing device 110. For example, if the user 101 desires access to the digital wallet application module 111 and provides the appropriate authentication, then access to the digital wallet application module 111 is provided to the user 101. The user 101 may then utilize the digital wallet application module 111 to conduct transactions or perform other functions.

In another embodiment, the handling technology may provide data that indicates, based on a match between the input and the stored input, that a likelihood exists that the user computing device 110 has not left the possession of the user 101. For example, if the handling technology provides inputs that indicated that the user 101 has utilized the user computing device 110 continually at the same angle, then a likelihood exists that the user 101 is the authenticated user 101. If the likelihood exists, then the authentication application 115 may extend the configured amount of time that must elapse before the user computing device 110 times out or goes inactive. For example, if the user computing device 110 is configured to end a user session after 1 hour, but the handling technology indicates that the user 101 has not lost possession of the user computing device 110, then the user session may be extended for an additional hour.

Figure 4:
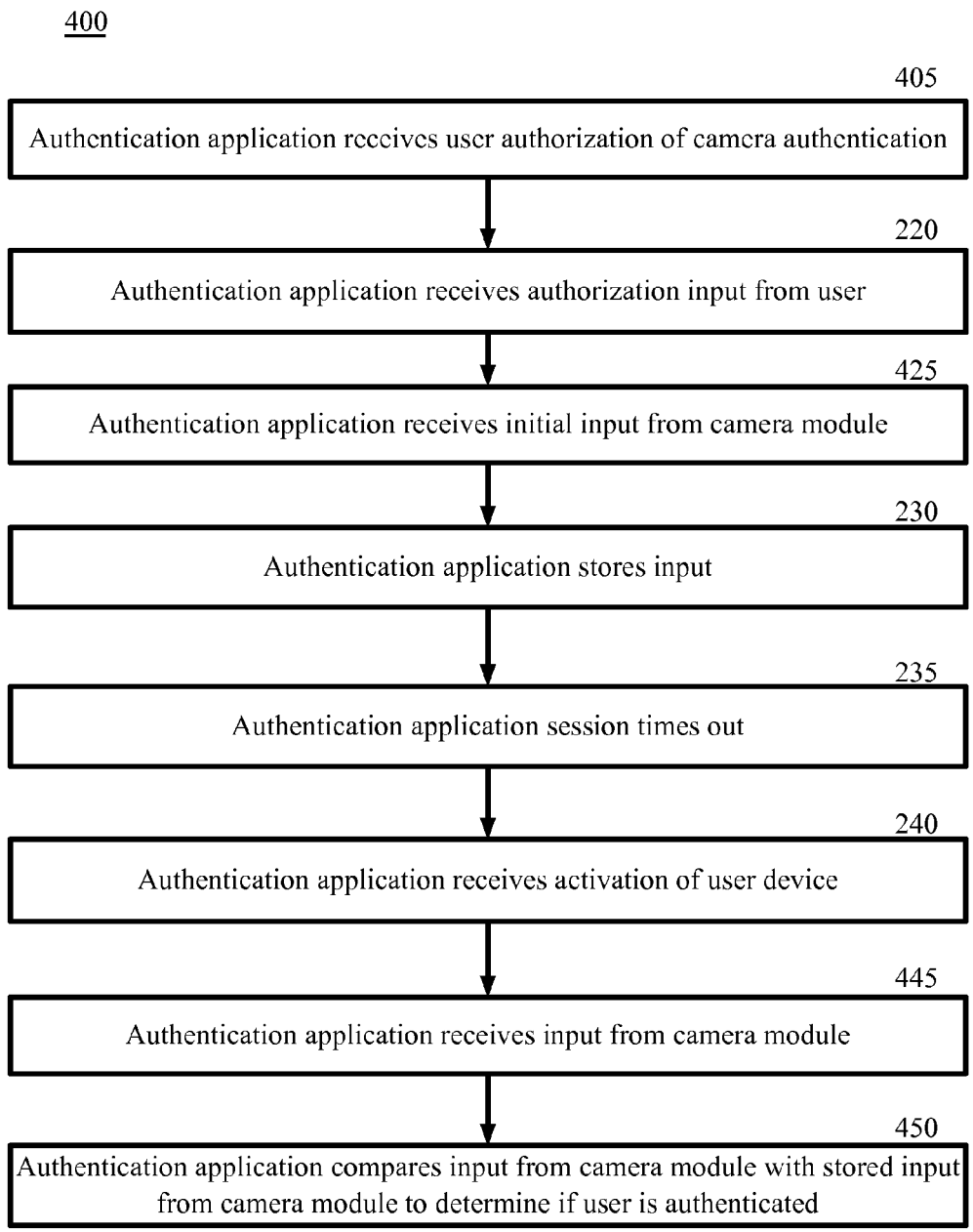
FIG. 4 is a block flow diagram depicting methods for authenticating users based on a camera module input, in accordance with certain example embodiments.

FIG. 4 is a block flow diagram depicting methods for authenticating users with a camera module 114, in accordance with certain example embodiments.

With reference to FIGS. 1 and 2, in block 405 the authentication application 115 receives user authorization of camera authentication of the user 101. The user 101 may select the camera module 114 for enablement for authentication purposes by actuating a control on the user interface associated with the camera module 114. For example, the user 101 may select a virtual control object labeled "enable" associated with the camera module 114. The authentication application 115 may provide an option for the reader to click a link or other function that provides an explanation to the user 101 of the manner in which the camera module 114 operates and the images that are logged by the camera module 114.

In block 220, the authentication application 115 receives the authorization input from the user 101. Block 220 is described in greater detail with respect to block 220 of FIG. 2.

In block 425, the authentication application 115 receives an initial input from the camera module 114.

In the example, after the user 101 authorized the use of an authentication technology, the authentication application 115 provides a request to the operating system of the user computing device 110 to initiate the authentication technology. For example, the authentication application 115 provides a request to the operating system of the user computing device 110 to initiate a camera module 114 to obtain one or more images. The management of the camera module 114, and thus the communication with the authentication application 115, may be performed by a specific application, by the authentication application 115, by the user computing device operating system, or by any suitable hardware or software.

The request may include instructions to the camera module 114 to take an initial image of the user 101 or any image to which the camera module 114 is directed. For example, the camera module 114 may be prompted by the user computing device 110 to capture an image as the user 101 finishes providing a PIN to initiate a user session. In an example, the camera module 114 may be directed to display a notice to the user 101 that an image is soon to be captured. In another example, the camera module 114 requests permission every time an image is to be captured. In another example, the camera module 114 notifies the user 101 after an image has been captured. In another example, after the user 101 authorizes the authentication application 115 initially, no further permission requests or notifications are provided.

In an example, the camera module 114 is initiated and begins a process to characterize the image. In an example, the authentication application 115 receives the image and identifies characteristics of the image by comparing the image to a database of image characteristics. In another example, an image recognition algorithm is applied to the image and image characteristics are extracted. Characteristics that may be extracted may include the color of a shirt being worn by the user 101, the facial hair of the user 101, the color of the hair of the user 101, the style of the hair of the user 101, objects in the background of the user 101, or any suitable characteristic. In another example, a facial recognition algorithm may be used to characterize and recognize the face of the user 101.

The characterization of the image and any suitable algorithms may be performed by any suitable hardware or software, such as the camera module 114, the authentication application 115, the operating system on the user computing device 110, a remote server or system, or any other suitable hardware or software.

After logging one or more measurements or other data, the camera module 114, or other hardware or software, communicates an input of the image characterization to the authentication application 115.

From block 425, the method 400 proceeds to block 230. Blocks 230 through 240 are substantially similar to blocks 230 through 240 as described in FIG. 2. From block 240, the method 400 proceeds to block 445.

In block 445, the authentication application 115 receives the input of the camera module 114. After the user 101 attempts to activate the inactive user computing device 110 or one or more inactive applications, the camera module 114 is requested to provide an input of an image to the authentication application 115. The request may be communicated via the operating system of the user computing device 110.

The camera module 114 may receive the request and initiate a process to obtain a user authentication. In an example, the camera module 114 captures an image of the user 101 or any image to which the camera module 114 is directed. For example, the camera module 114 may be prompted by the user computing device 110 to capture an image as the user 101 finishes initiating a user session. In an example, the camera module 114 may be directed to display a notice to the user 101 that an image is soon to be captured. In another example, the camera module 114 requests permission every time an image is to be captured. In another example, the camera module 114 notifies the user 101 after an image has been captured. In another example, after the user 101 authorizes the authentication application 115 initially, no further permission requests or notifications are provided. The data logged by the camera module 114 is communicated to the authentication application 115.

In block 450, the authentication application 115 compares the input of the image with the stored input to determine if the user 101 is authenticated. The authentication application 115 accesses the database associated with the user 101 and extracts image characteristics from the previous input from the camera module 114. Characteristics of the current image are extracted in a similar manner as the characteristics of the previous image as described in block 425. The characteristics of the current image are compared to the characteristics of the previous image to determine if a match exists of one or more of the characteristics. In certain examples, the match is not required to be an exact match. A margin of error between the inputs may be allowed based the configuration of the authentication application 115. In an example, the shirt of the user 101 may be the same shirt from the previous image, but a difference in lighting may cause the image of the shirt to appear different. If the color of the shirt of the user 101 is not exactly the same as the previous image, the inputs will still be considered a match if the colors in the images are within a configured range of each other.

In an example, a configured number of characteristics in the image are required to match for the image to authenticate the user 101. For example, the shirt color, the facial hair, and the glasses of a user 101 must match for the user 101 to be authenticated. In certain embodiments, the characteristics that match are calculated as a percent likelihood that the user is the authenticated user 101. For example, a stored image identified five characteristics of the user 101. In the current image, only 4 of the characteristics matched. The authentication application 115 may consult a database that provides a likelihood that the user is the authenticated user 101 based on the characteristics that did match.

In an example, a configured number of authentication technology inputs must provide matching results for the user 101 to be authenticated. For example, the camera module 114 may be one of three authentication technologies may be required to authenticate the user 101. In another example, the camera module 114 alone may configured to provide an authentication of the user 101. In another example, camera module 114 may not produce a match, but the user 101 may still be authenticated if a one or more other authentication technologies provide matching inputs.

If the user 101 is authenticated, then the authentication application 115 and/or the user computing device 110 allows the user 101 access to the desired functions of the user computing device 110. For example, if the user 101 desires access to the digital wallet application module 111 and the authentication technologies provide the appropriate authentication, then access to the digital wallet application module 111 is provided to the user 101. The user 101 may then utilize the digital wallet application module 111 to conduct transactions or perform other functions.

Figure 5:
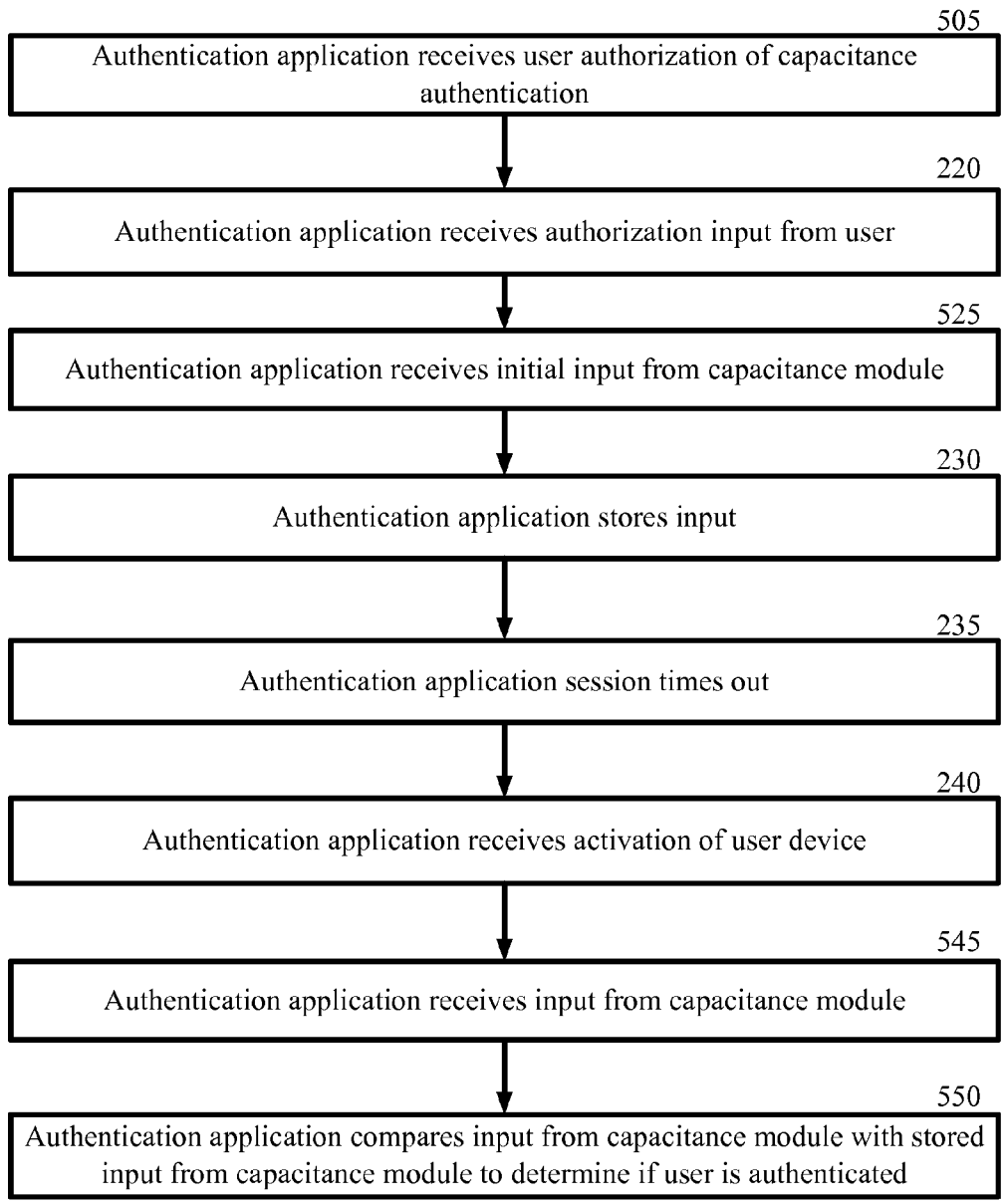
FIG. 5 is a block flow diagram depicting methods for authenticating users based on a capacitance module input, in accordance with certain example embodiments.

FIG. 5 is a block flow diagram depicting methods 500 for authenticating users 101 with a capacitance module 117, in accordance with certain example embodiments.

With reference to FIGS. 1 and 2, in block 505 the authentication application 115 receives user authorization of the capacitance authentication of the user computing device 110. The user 101 may select the capacitance module 117 for enablement for authentication purposes by actuating a control on the user interface associated with the capacitance module 117. For example, the user 101 may select a virtual control object labeled "enable" associated with the capacitance module 117. The authentication application 115 may provide an option for the reader to click a link or other function that provides an explanation to the user 101 of the manner in which the capacitance module 117 operates and the data that is logged by the user capacitance module 117.

In block 220, the authentication application 115 receives the authorization input from the user 101. Block 220 is described in greater detail with respect to block 220 of FIG. 2.

In block 525, the authentication application 115 receives an initial input from the capacitance module 117.

In the example, after the user 101 authorized the use of the capacitance module 117, the authentication application 115 provides a request to the operating system of the user computing device 110 to initiate the capacitance module 117. For example, the authentication application 115 provides a request to the operating system of the user computing device 110 to initiate a capacitance module 117 to obtain a capacitance of the user 101. The management of the capacitance module 117, and thus the communication with the authentication application 115, may be performed by a specific application, by the authentication application 115, by the user computing device operating system, or by any suitable hardware or software.

The request may include instructions to the capacitance module 117 to take an initial capacitance of the user 101 or any other electrical property of which the capacitance module 117 is capable of detecting. For example, the camera module 114 may be prompted by the user computing device 110 to capture a capacitance as the user 101 finishes providing a PIN to initiate a user session.

In an example, the capacitance module 117 may be directed to display a notice to the user 101 that a capacitance is soon to be captured. In certain embodiments, the user 101 must be directed by the user computing device 110 to place two fingers on sensors on the user computing device 110. The user 101 may be requested to place two fingers of the same hand on the sensors or two fingers on different hands. The capacitance of a user 101 may vary based on the body parts placed on the sensor. For example, two fingers on the same hand may have a different capacitance reading than two fingers from different hands. Any other body part, such as a palm may be requested. In certain embodiments, or for certain electrical property measurements, any other suitable procedures may be requested of the user 101. In another example, the capacitance module 117 requests permission every time capacitance is to be captured.

In another example, the capacitance module 117 notifies the user 101 after a capacitance has been captured. In certain embodiments, the capacitance or other electrical property of the user 101, is captured without a specific action of the user. That is, the capacitance may be captured while the user 101 is merely holding the user computing device 110. In another example, after the user 101 authorizes the authentication application 115 initially, no further permission requests or notifications are provided.

In an example, the capacitance module 117 is initiated and begins a process of capturing a capacitance of the user 101. In an example, the authentication application 115 receives and logs the capacitance from the capacitance module 117. In another example, other electrical properties of the user 101 may be received, calculated, or inferred.

From block 525, the method 500 proceeds to block 230. Blocks 230 through 240 are substantially similar to blocks 230 through 240 as described in FIG. 2. From block 240, the method 500 proceeds to block 545.

In block 545, the authentication application 115 receives the input of the capacitance module 117. After the user 101 attempts to activate the inactive user computing device 110 or one or more inactive applications, the capacitance module 117 is requested to provide a capacitance measurement to the authentication application 115. The request may be communicated via the operating system of the user computing device 110.

The capacitance module 117 may receive the request and initiate a process to obtain a user capacitance. For example, the capacitance module 114 may be prompted by the user computing device 110 to capture a capacitance after the user 101 finishes initiating a user session. In an example, the capacitance module 117 may be directed to display a notice to the user 101 that a capacitance measurement is requested to authenticate the user 101. In another example, the capacitance module 117 requests permission every time a capacitance is to be captured. In another example, the capacitance module 117 notifies the user 101 after a capacitance has been captured. In this instance, the capacitance module 117 may obtain a capacitance measurement without the user 101 performing any specific action, such as placing fingers on the sensors. In another example, after the user 101 authorizes the authentication application 115 initially, no further permission requests or notifications are provided. The data logged by the capacitance module 117 is communicated to the authentication application 115.

In block 550, the authentication application 115 compares the input of the capacitance with the stored input to determine if the user 101 is authenticated. The authentication application 115 accesses the database associated with the user 101 and extracts capacitance from the previous input from the capacitance module 117. The capacitance is compared to the stored capacitance to determine if a match exists. In certain examples, the match is not required to be an exact match. A margin of error between the inputs may be allowed based the configuration of the authentication application 115. In an example, the capacitance may be similar, but not exactly the same as the stored capacitance. For example, the capacitance of a user 101 may vary based on factors such as the time of day, atmospheric conditions, the presence of outside substances on the hands of the user 101 or on the sensors, or any other factors. If the capacitance of the user 101 is not exactly the same as the stored capacitance, the inputs will still be considered a match if the capacitances are within a configured range of each other.

In an example, a configured number of authentication technology inputs must provide matching results for the user 101 to be authenticated. For example, the capacitance module 117 may be one of three authentication technologies may be required to authenticate the user 101. In another example, the capacitance module 117 alone may configured to provide an authentication of the user 101. In another example, the capacitance module 117 may not produce a match, but the user 101 may still be authenticated if a one or more other authentication technologies provide matching inputs.

If the user 101 is authenticated, then the authentication application 115 and/or the user computing device 110 allows the user 101 access to the desired functions of the user computing device 110. For example, if the user 101 desires access to the digital wallet application module 111 and provides the appropriate authentication, then access to the digital wallet application module 111 is provided to the user 101. The user 101 may then utilize the digital wallet application module 111 to conduct transactions or perform other functions.

In alternate embodiments, other authentication technologies may be utilized. For example, the user computing device 110 may utilize the manner in which the user 101 types or swipes on a user interface of the user computing device 110 to authenticate a user 101. For example, the user computing device 110 may log the speed with which a user 101 types and the amount of pressure the user 101 applies to the user interface to input data. In another example, the user computing device 110 may log the direction, speed, pressure, and other aspects associated with a swipe of a user 101.

In a similar manner to the methods described in FIGS. 2-5, the authentication application 115 logs the user swiping and typing patterns, stores the patterns in a database, receives new patterns when a user computing device 110 is initiated after a user session ends, compares the patterns, and authenticates the user 101 if the patterns match.

In alternate embodiments, the user computing device 110 may utilize the chemical composition of the body of the user 101 to authenticate a user 101. For example, the user computing device 110 may detect an odor associated with a user 101. For example, if a user 101 wears a particular cologne or hand cream, the user computing device may detect the odor and associate the odor with the user 101.

In a similar manner to the methods described in FIGS. 2-5, the authentication application 115 logs the odor or other chemical detection, stores the odor in a database, receives a new odor when a user computing device 110 is initiated after a user session ends, compares the odors, and authenticates the user 101 if the odors match.

In alternate embodiments, the user computing device 110 may utilize the voice pattern of the user 101 to authenticate a user 101. For example, the user computing device 110 may detect a voice pattern of a user 101 when the user 101 speaks around the user computing device 110. The voice may be detected by a microphone or other input technology of the user computing device 110. The user computing device 110 may detect the voice patterns of the user 101 while the user 101 is speaking but not actively engaged with the user computing device 110. For example, the user computing device 110 may detect the voice patterns of the user 101 while the user 101 is talking to a co-worker in the background while initiating the user computing device 110. In another example, the user 101 speaks in to the microphone of the user computing device 110 when requested by the user computing device 110.

In a similar manner to the methods described in FIGS. 2-5, the authentication application 115 logs the user voice patterns, stores the patterns in a database, receives new patterns when a user computing device 110 is initiated after a user session ends, compares the patterns, and authenticates the user 101 if the patterns match.

Figure 6:
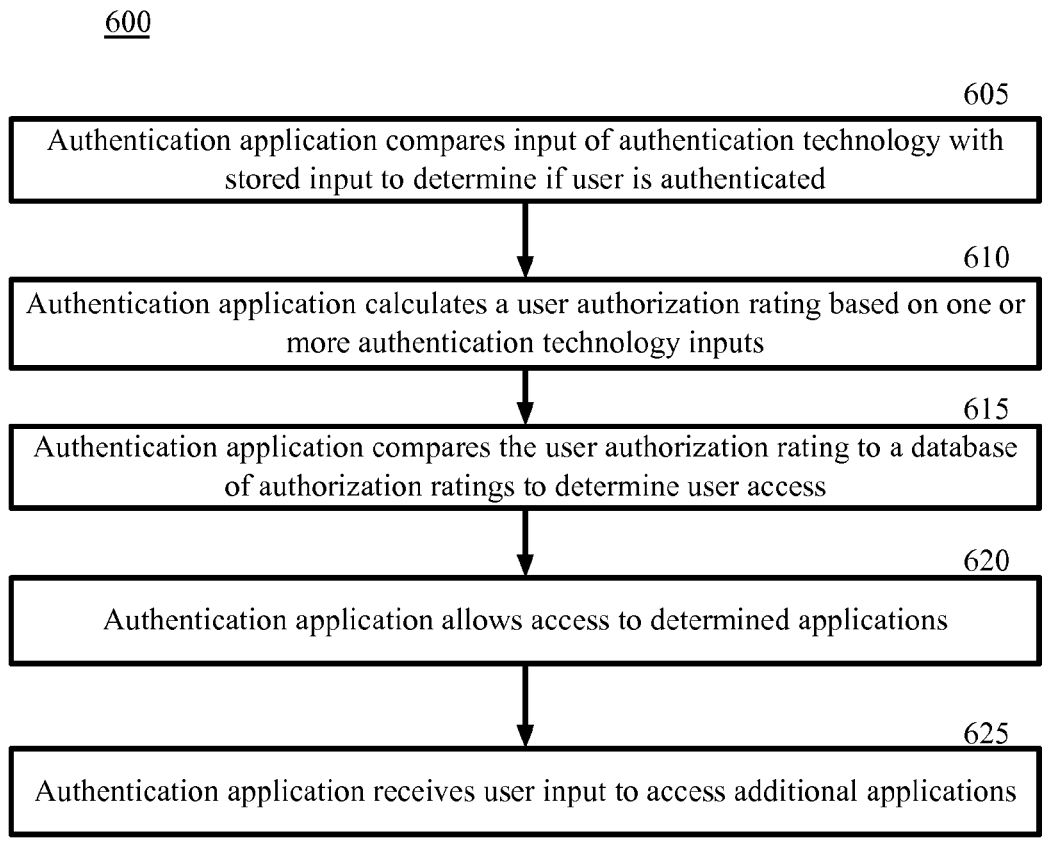
FIG. 6 is a block flow diagram depicting methods for authorizing users based on authentication results.

FIG. 6 is a block flow diagram depicting methods 600 for authorizing users 101 based on authentication results.

With reference to FIGS. 1 and 6, in block 605, the authentication application 115 compares an input of authentication technology with a stored input to determine if a user 101 is authenticated. The method 600 for comparison is performed in a similar manner, and using similar authentication technologies, to the methods described in FIGS. 2-5. The comparison produces a list of authentication technologies and the related results of each authentication technology. For example, if the capacitance module 117 produces a match for a current authentication result and a stored capacitance for a user 101, then the match is identified as a positive authentication state of the user 101.

In another example, the camera module 114 may produce more than one authentication match. For example, the color of the shirt of the user may be a match, but a facial recognition algorithm may fail to produce a match. In certain examples, the multiple authentication results from an authentication technology may be averaged, summed, or have any mathematical or other manipulation performed on the results to produce a useful result. For example, the camera module 114 may have a weighted average of the results produced. The weighted average may be represented as a percentage, such as a 50% match, a letter grade, or any suitable result designation. Certain results from a single authentication technology may be given more weight than others. For example, in the camera module 114 example, a facial recognition algorithm result may be weighted more heavily than a shirt color recognition.

In block 610, the authentication application 115 calculates a user authorization rating based on one or more authentication technology inputs. The authentication application 115 may determine an authentication state for each authentication technology input and use the authentication states to calculate the user authorization rating. In an example, the authentication application 115 may determine that the capacitance module 117 produced a match with the stored input, the camera module 114 produced a match for the shirt color and the facial hair, the handling technology produced a match for the angle of the user computing device 110, but the voice recognition did not produce a match for the user 101. In this example, a 100% match of the authentication technologies was not produced.

The authorization application 115 may produce a user authorization rating based on the results of authentication technology inputs. The user authorization rating may be a letter grade, such as a "B," a percentage such as 75%, a label, such as "Likely to be the User," or any other rating format. The rating may be based on the average or weighted averages of the results as described above in block 605, a comparison of the results to a database of user ratings, or in any suitable manner.

In block 615, the authentication application 115 compares the user authorization rating to a database of authorization ratings to determine user access. In an example, the authentication application 115 determines that a user 101 has a rating of "A" based on the authentication technology inputs. The authentication application 115 accesses the database and determines that with an A rating, the user 101 is allowed access to all applications, modules, and other hardware and software on the user computing device 110.

The database may be a database that applies to all user computing devices 110 or a group of user computing devices 110. For example, the database may apply to all users 101 of a particular model of smartphone, or to all users 101 of a particular cellular provider. In another example, the database may be customized for the user 101 based on input from the user 101, input from a payment processing system 140, based on the history of the user 101 on the user computing device 110, or any other suitable factor. The database may be stored on the user computing device 110, the data storage unit 113, the payment processing system 140, or in any other suitable location.

In another example, the authentication application 115 determines that a user 101 has a rating of 50% based on the authentication technology inputs. The authentication application 115 thus allows the user 101 access to a group of applications, but withholds access from the digital wallet application module 111. The allowed applications may be directed toward functions that are not deemed by the authentication application 115 to be security risks. For example, the user 101 may be allowed access to the camera module 114, a contact list application, and one or more games.

In another example, if 5 out of 6 authentication technologies indicate that the user 101 is the authorized user 101, then the database may provide a recommendation to the authentication application 115 to allow full access to the user 101. If only 2 out of 5 authentication technologies indicate that the user 101 is the authorized user 101, then the database may provide a recommendation to the authentication application 115 to allow the user 101 to access the user computing device 110, but withhold any secure data or applications that are configured as secure applications.

In certain examples, based on the comparison with the database, the authentication application 115 may allow any percentage of applications or programs on the user computing device 110 to be accessed, such as 10% of the applications, 50% of the applications, all of the applications, or none of the applications.

The rating may be classified as an authentication state. For example, the authentication state may be a positive authentication state, such as "authorized" or a negative authentication state, such as "not authorized."

In block 620, the authentication application 115 allows access to the determined applications. In an example, the authentication application 115 may limit access to one or more applications by communicating the authentication status of the user 101 to the operating system of the user computing device 110. The authentication application 115 may communicate a list of applications to which the user 101 is to be allowed access and/or a list of applications from which the access of the user 101 is restricted. The operating system of the user computing device 110, allows the user 101 access to the allowed applications and prevents the user 101 from accessing the applications that are not allowed. In an example, the operating system of the user computing device 110 provides instructions to the restricted applications that prevent the applications from opening or initiating certain features of the applications.

In an alternate embodiment, the authentication application 115 provides the user rating to one or more applications. The applications, or systems associated with the applications, determine if the user 101 is allowed access to one or more of the functions of the application. The user rating may be provided to an application on the user computing device 110 or to a remote system associated with the application.

In an example, the authentication application 115 provides the user rating to the payment processing system 140 that is associated with the digital wallet application module 111. The payment processing system 140 may access a database that provides the features of the digital wallet application module 111 that the user 101 may access based on the user rating. The payment processing system 140 may communicate the allowed features to the digital wallet application module 111 on the user computing device 110. In another example, the payment processing system 140 prevents the digital wallet application module 111 from conducting any transactions or performing any other unauthorized functions on the account of the user 101.

In another example, the authentication application 115 provides the user rating to an email system server that is associated with an email application on the user computing device. The email system server may access a database to determine the features of the email system that the user 101 may access based on the user rating. For example, based on the user rating of "C," the email system server may allow the user 101 to access the first 10 emails on the email account of the user 101, but not allow the user 101 to send or receive subsequent emails. In another example, based on an "A" rating, the email system server may allow the user 101 to access all of the features of the email system and send and receive emails.

In block 625, in certain embodiments, the user 101 may override the authentication application 115 authentication state by inputting a password, PIN, or other manual authentication input. The manual authentication input may be entered into a user interface of the user computing device 110. The manual authentication input opens a new user session and does not depend on the authentication technology inputs.

Other Example Embodiments

FIG. 7 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain example embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor

2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to authenticate users on user computing devices with capacitance measurements, comprising:

receiving, by one or more computing devices, a manual authentication input of a user via a user interface of a user computing device, the manual authentication being configured to begin a first user authorized session with the user computing device;

communicating, by the one or more computing devices, a request for user authorization data to a capacitance module associated with the one or more computing devices;

receiving, by the one or more computing devices, first user authentication data from the capacitance module, the first user authentication data comprising a first capacitance measurement captured from a first application of the capacitance module to the user of the one or more computing devices, the first capacitance measurement being obtained without a specific action from the user;

receiving, by the one or more computing devices, an input to end the first user authorized session;

ending, by the one or more computing devices, the first user authorized session;

receiving, by one or more computing devices, an input to begin a second authorized user session with the user computing device;

communicating, by the one or more computing devices, a request for user authorization data to the capacitance module associated with the one or more computing devices;

receiving, by the one or more computing devices, second user authentication data from the capacitance module, the second user authentication data comprising a second capacitance measurement captured from a second application of the capacitance module to the user, the second capacitance measurement being obtained without a specific action from the user;

comparing, by the one or more computing devices, the first user authentication data to the second user authorization data;

generating, by the one or more computing devices, a user authentication rating based at least in part on a match of the first user authentication data and the second user authentication data based at least in part on the first capacitance measurement and the second capacitance measurement;

comparing, by the one or more computing devices, the generated user authentication rating to a database of applications, wherein each user authentication rating in the database has a corresponding minimum authentication rating in which the user is granted access to that application and wherein there are at least two different minimum authentication ratings; and determining, by the one or more computing devices, one or more applications operating on the one or more computing devices to which the user is allowed access during the second authorized user session based on the comparison.

2. The method of claim 1, wherein the identified match is determined to be a match if a measured capacitance in the first user authentication data and a measured capacitance in the second user authorization data are within a configured range of each other.

3. The method of claim 1, wherein each capacitance measurement is obtained by passing an electrical signal through one or more sensors located on the user computing device.

4. The method of claim 1, further comprising generating, by the one or more computing devices, a user authentication rating based on the identified match.

5. The method of claim 1, wherein the user is not allowed access to any functions of the one or more computing devices based on the comparison.

6. The method of claim 1, wherein the user is allowed access to all functions of the one or more computing devices based on the comparison.

7. The method of claim 1, wherein the user computing comprises the one or more computing devices.

8. A computer program product, comprising:
a non-transitory computer-readable storage device having computer-executable program instructions embodied thereon that when executed by a computer cause the computer to authenticate users with capacitance measurements, the computer-executable instructions comprising:
computer-executable program instructions to receive first user authentication data from a capacitance module associated with the computer, the first user authentication data comprising a first capacitance measurement captured from a first application of the capacitance module to a user of the computer during a first user authenticated session with the computer, the first capacitance measurement being obtained without a specific action from the user;
computer-executable program instructions to receive an input to end the first user authorized session after receiving first user authentication data;
computer-executable program instructions to end the first user authenticated session based on the received input to end the first user authorized session;
computer-executable program instructions to receive an input to begin a second authenticated user session with computer;
computer-executable program instructions to receive second user authentication data from the capacitance module, the second user authentication data comprising a second capacitance measurement captured from a second application of the capacitance module to the user, the second capacitance measurement being obtained without a specific action from the user;
computer-executable program instructions to generate a user authentication rating based at least in part on a match of the first user authentication data and the second user authentication data based at least in part on the first capacitance measurement and the second capacitance measurement;
computer-executable program instructions to compare the generated user authentication rating to a database of applications, wherein each user authentication rating in the database has a corresponding minimum authentication rating in which the user is granted access to that application and wherein there are at least two different minimum authentication ratings; and
computer-executable program instructions to determine one or more applications operating on the computer to which the user is allowed access during the second authenticated user session based on the comparison.

9. The computer program product of claim 8, wherein the identified match is determined to be a match if a measured capacitance in the first user authentication data and a measured capacitance in the second user authorization data are within a configured range of each other.

10. The computer program product of claim 8, wherein each capacitance measurement is obtained by passing an electrical signal through one or more sensors located on the computer.

11. The computer program product of claim 8, wherein the user is not allowed access to any functions of the computer if the match is not identified.

12. A system to authenticate users on user computing devices with capacitance measurements, comprising:
a storage device associated with a user computing device; and
a processor associated with the user computing device and communicatively coupled to the storage device, wherein the processor executes application code instructions that are stored in the storage device to cause the system to:
receive first user authentication data from a capacitance module associated with the user computing device, the first user authentication data comprising a first capacitance measurement of a user of the system during a first authorized session with the system, the first capacitance measurement being obtained without a specific action from the user;
receive an input to end the first user authorized session;
receive a request to begin a second authorized session with the system after termination of the first authorized session;
receive second user authentication data from the capacitance module, the second user authentication data comprising a second capacitance measurement of the user, the second capacitance measurement being obtained without a specific action from the user;
generate a user authentication rating based at least in part on a match of the first user authentication data and the second user authentication data based at least in part on the first capacitance measurement and the second capacitance measurement;
compare the generated user authentication rating to a database of applications, wherein each user authentication rating in the database has a corresponding minimum authentication rating in which the user is granted access to that application and wherein there are at least two different minimum authentication ratings; and
determine one or more applications operating on the computer to which the user is allowed access during the second authenticated user session based on the comparison.

13. The system of claim 12, wherein each capacitance measurement is obtained by passing an electrical signal through one or more sensors located on the user computing device.

14. The system of claim 12, wherein the user is not allowed access to any functions of the user computing device if the match is not identified.

15. The system of claim 12, wherein the user is allowed access to all functions of the user computing device if the match is identified.

\* \* \* \* \*